Patented Aug. 11, 1953

2,648,705

UNITED STATES PATENT OFFICE 2,648,705

REACTION PRODUCTS OF ORGANIC SULF-OXIDES AND HYDRAZOIC ACID

Laszlo Reiner, Bloomfield, and Fernanda Fiordalisi, née Fernanda Misani, Newark, N. J., assignors to Wallace & Tiernan Company, Inc., a corporation of New Jersey No Drawing. Application June 6, 1950, Serial No. 166,534

7 Claims. (Cl. 260—534)

This invention relates to new chemical compounds and their methods of preparation. More specifically the invention embraces the discovery of new organic compounds comprising a sulfur atom separately and directly linked to an oxygen atom, an NH group and two carbon atoms. In a structural sense the new compounds may be considered as derivatives of thioethers, but more specifically as derivatives of sulfoxides of thioethers. It is preferred, however, to call the new compounds sulfoximines, a name which appears to define and suggest the new chemical structure in an apt manner.

As described above, the new substances are represented by compounds having the following type of formula:

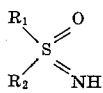

It will be appreciated that in accordance with modern chemical theory the double bonds in this structure are understood to be of the semipolar type, and could alternatively be so illustrated.

More specifically in the new compounds each of $R_1$ and $R_2$ includes a carbon atom which is directly attached to the sulfur atom, i. e. so that $R_1$ and $R_2$ are linked to S through carbon atom bonds. Thus the compounds of the invention are specifically characterized by containing the following novel structure:

While the novelty and utility of the new compounds are understood to be independent of the method of preparation, a special and further feature of the invention is the discovery that these compounds, i. e. the sulfoximines, may be very conveniently and efficiently produced by reacting, with hydrazoic acid, derivatives of thioethers, especially sulfoxides characterized by the structure

or compounds which tend to hydrolyze to form sulfoxide in the presence of water.

It has been known that hydrazoic acid reacts with compounds containing carbonyl groups, such as aldehydes, ketones, carboxylic acids, and their esters, amides, lactones, azalactone, thiolactones, nitriles, oximes, amidoximes, unsaturated hydrocarbons, and, under certain more rigorous conditions, with aromatic nuclei. The products of such reaction, as heretofore indicated, have been amines, their derivatives, imides and tetrazoles. In all of these cases, the resultant of the reaction contained the group introduced nitrogen attached to a carbon atom, the reaction being sometimes known as the Schmidt reaction. It does not appear, however, that any reaction between sulfoxides, or derivatives of thioethers, and hydrazoic acid has been achieved or even attempted, nor has there been any disclosure, so far as we are aware, of the new compounds mentioned above (in which the introduced nitrogen is attached to a sulfur atom) or of the present, peculiarly advantageous process for preparing them. Indeed, it was previously found that while compounds containing sulfur often catalyzed the decomposition of hydrazoic acid by iodine, the thioether, methionine, did not exert such an effect. (E. Friedman: Sulfhydrylverbindungen als Katalysatoren, Jr. für praktische Chemie N. F., Band 146, 1936, page 179 et seq.). It is therefore surprising to find that such reaction will occur as to produce the new chemical structure of the present compounds, and especially to find that structures embodying the CS(O)C group, i. e. the sulfoxides of thioethers, may be reacted readily with hydrazoic acid to yield sulfoximines as defined above.

Generally stated, the procedure presently employed for carrying out the new reaction and producing the sulfoximines is as follows:

By way of preliminary, a solution of hydrazoic acid is prepared in the usual manner by reacting sodium azide with concentrated sulfuric acid and extracting the hydrazoic acid, as formed, with chloroform or another suitable organic solvent. The solution of hydrazoic acid is then dried with a suitable drying agent, e. g., sodium sulfate, and thereafter analyzed for hydrazoic acid content. It will be understood that the analysis is desirable in order to be sure that optimum proportions of reactants are employed in the process of the invention, present preference being for the use of an excess of hydrozoic acid.

To carry out the main reaction, the sulfoxide to be employed is dissolved, suspended or emulsified in chloroform or other suitable organic solvent; while some sulfoxides are sufficiently soluble to dissolve in one or another of such solvents, satisfactory results are obtained with sulfoxides which are relatively insoluble in the solvent employed, the preliminary mixture being then prepared as a suspension of a solid sulfoxide or emulsion of one which is in liquid form. Although chloroform is now preferred as the medium in which the sulfoxide is dispersed and in which the reaction is carried out, other solvents can be used such as other chlorinated hydrocarbons, benzene, dioxane, ethyl ether, or suitable mixtures of such solvents. While we have prepared a large variety of compounds embodying the sulfoximine structure by the present process, it is recognized that in the case of large molecules, such as macromolecules, steric hindrances and the like may interfere with the desired reaction. Accordingly it is at present greatly preferred to deal only with substances of smaller molecular size, i. e. to use thioether sulfoxides having a molecular weight, for example, of less than 1000, the new products being correspondingly limited as a matter of special preference.

It is also very greatly desirable, and indeed necessary in at least many cases for usefully high yield, to employ a catalyst in the reaction between sulfoxide and hydrazoic acid. While the catalytic effect can be obtained in other ways or by otherwise introducing a substance to serve such purpose, a particularly convenient procedure is to embody the catalyst material in the mixture of the solvent and the sulfoxide before the addition of the hydrazoic acid is initiated. We now prefer to use sulfuric acid as the catalyst, but any of a number of other compounds, which may be conveniently classed as acidic compounds, can be employed in many cases. In general, catalysts of the type useful in the Schmidt reaction are effective, examples of such acidic compounds being dry hydrochloric acid, phosphoric acid, aluminum chloride, ferric chloride, zinc chloride, stannic chloride, antimony trichloride, phosphorus trichloride and pentachloride, phosphorus pentoxide, phosphorus oxychloride, thionyl chloride, and their equivalents, other catalysts useful in our process being sulfoacetic acid and other sulfonic acids. Ultraviolet light can also be used as an adjuvant in promoting the present new reaction.

Before adding the hydrazoic acid to the mixture, i. e. the solution or other dispersion comprising the sulfoxide, catalyst and solvent (if used), we usually warm the mixture to a temperature of, say, 40° to 50° C. To the warmed mixture, the hydrazoic acid solution is then added, preferably in small portions, as by running the reagent in slowly or in successive small amounts. Alternatively, the hydrazoic acid can be generated in the reaction mixture by adding a salt or mixture of salts of hydrazoic acid to the sulfoxide mixture (solution, emulsion or suspension), providing the latter has an acid content, e. g. contains an acid catalyst. Thus successive, small quantites of the sodium, potassium or other alkali or alkaline earth salt or salts of hydrazoic acid can be supplied to achieve the reaction under such circumstances. In all cases, best results have been achieved where the total amount of hydrazoic acid (either added as such or formed, at least in effect, in situ for immediate utilization) is in excess stoichiometrically with respect to the sulfoxide; that is to say, a good yield is then obtained relative to the sulfoxide, although it will be understood that the reaction will nevertheless usefully proceed where the total of the added amounts of hydrazoic acid or its equivalent is equal to or even considerably less than the stoichiometric quantity. It will also now be understood that unless otherwise specified, general references herein, and likewise references in the claims, to the procedure of reacting or treating a substance with hydrazoic acid are intended to include the actual addition of this reagent in either or both of the forms explained above, i. e. the acid per se, or one or more of its salts.

After the last portion of the hydrazoic reagent has been added, the reaction is allowed to proceed or continue at the same temperature until the formation of gas, i. e. nitrogen, has ceased. The reaction mixture is finally poured onto crushed ice or otherwise cooled, and from it there may then be isolated, for instance by steps such as set forth in the examples below, the resulting new compound which has the characteristic sulfoximine structure described above.

It is found that hydrazoic acid reacts under similar conditions with a number of functional groups, including not only the sulfoxides as has now been discovered, but also other groups such as those involved in the Schmidt reaction mentioned above. Thus if the sulfoxide contains, in addition to the sulfoxide group, one or another of the other functional groups with which hydrazoic acid may react, enough of the acid may be employed in the present process to react with groups of the latter category as well as with sulfoxide; on the other hand, the circumstances in some cases may be such that the hydrazoic acid reacts with the sulfoxide alone, or in a preferential manner so as to permit isolation of a reaction product involving no change except in the sulfoxide group. The functional groups which under certain circumstances might interfere with the reaction of the present invention, for example to the extent of utilizing more or less of the hydrazoic acid that was intended for reaction with sulfoxide, include: carbonyl groups, e. g. ketones, aldehydes, carboxylic acids, and their esters and amides; thioaldehydes, thioketones, thioesters; unsaturated compounds (which, however, if conjugated would react with hydrazoic acid only at the higher temperatures, say about 70° C.); secondary and tertiary hydroxyl groups and aliphatic halides, which may tend to produce unsaturated compounds under conditions of the sort employed for present reaction. In any event, the reaction with sulfoxide will ordinarily proceed even though other reactant groups may be present, and will proceed to a satisfactory extent if ample quantities of the hydrazoic acid are supplied. Alternatively, sulfoximines containing groups which might themselves react with hydrazoic acid, can be produced by first preparing a sulfoximine having a non-interfering functional group that can be converted to the desired group, and then effecting such conversion by procedure of known character.

As indicated above, the novel compounds of the present invention may be defined as having a sulfur atom and four constituents directly and separately linked thereto, the constitutents being respectively an oxygen atom, the NH group and two carbon atoms. Each of the carbon atoms may form part, as will be apparent from the examples hereinbelow, of any of a variety of groups, for instance such that $R_1$ and $R_2$ in the first-mentioned formula are either different or alike or may indeed constitute the remaining elements of a heterocyclic ring of which the sulfur is one member. The new compounds, i. e. the sulfoximines, can be used as intermediates in organic syntheses of various kinds, and for like purposes; for example, they may be used for the production of monomers from which polymers can be prepared, and they may be used in the manufacture of dyes.

By way of further illustration of the novel procedure and of the variety of embodiments of the new type of compound that can be produced thereby, the following examples are set forth.

Example I

Diamyl sulfoxide (0.044 mol) in 50 cc. of chloroform was placed in a three-necked flask equipped with thermometer, mercury sealed stirrer, dropping funnel, and gas exit tube. Concentrated sulfuric acid (11.5 cc.) was added and the mixture was heated to 40°–45° C. Hydrazoic acid (0.085 mol) dissolved in 31 cc. of chloroform was added dropwise over a period of three hours. The mixture was then stirred for two additional hours at the same temperature; at the end of that time the evolution of nitrogen had ceased. The reaction mixture was then poured into ice water, and the chloroform layer removed and concentrated. The product, in crude form in the concentrate, was thereafter crystallized from petroleum ether. By the stated crystallization, a pure compound was obtained consisting of colorless needles melting at 56°–57° C. The substance was found to be sparingly soluble in water, but soluble in most organic solvents; it was a compound of the novel structural character herein described, and thus properly identified as diamyl sulfoximine. Analysis gave: nitrogen 6.95%, carbon 58.31%, hydrogen 11.16%, sulfur 15.50%; calculated for $C_{10}H_{23}NOS$: nitrogen 6.82%, carbon 58.48%, hydrogen 11.28%, sulfur 15.61%.

Example II

To 0.033 mol of diphenyl sulfoxide placed in a suitable reaction vessel 11.5 cc. of concentrated sulfuric acid were added. The chloroform solution of hydrazoic acid (0.52 mol) was then added in small portions while stirring vigorously. The temperature was then brought to 50° C. (from a somewhat lower value) and maintained for an additional 2½ hours. The mixture was agitated vigorously during that period. It was then poured into ice water, and neutralized with sodium hydroxide. The chloroform layer was removed and the aqueous layer repeatedly extracted with chloroform. The combined chloroform solutions were concentrated and the crude product constituted by the concentrate was treated with petroleum ether for crystallization of the compound from the latter. The crystals thus obtained represented a pure product, in the form of colorless needles melting at 97°–98° C. The substance was a compound of the novel character herein described, specifically diphenyl sulfoximine. It was sparingly soluble in water, slightly soluble in petroleum ether and soluble in a number of other common organic solvents. Elementary analysis gave the following values: carbon 66.22, hydrogen 4.89, sulfur 14.53, nitrogen 6.61; calculated, carbon 66.33, hydrogen 5.09, sulfur 14.76, nitrogen 6.44.

The foregoing examples illustrate the application of the process to the preparation of corresponding sulfoximines, with both alkyl and aryl sulfoxides. The scope of the process and product are further illustrated by the following further examples, of which the first (III) describes the production of an alkaryl alkyl sulfoximine.

Example III

Para-tolyl methyl sulfoxide (0.05 mol) was mixed with 12 cc. of concentrated sulfuric acid in a reaction vessel of a type suitable (as will now be understood) for these reactions. Hydrazoic acid (0.1 mol) dissolved in chloroform was added gradually over a period of one hour. The reaction mixture was agitated and heated to 45° C. and kept at that temperature an additional three and one-half hours. The resulting reaction product, p-tolyl methyl sulfoximine was isolated in a manner similar to that described in Example II. It was then recrystallized from a mixture of chloroform and petroleum ether. As thus purified, it had a melting point of 66–68° C. On analysis, nitrogen found, 8.37; calculated, 8.27.

Example IV

To methionine sulfoxide (0.1 mol) suspended in 100 cc. of chloroform and placed in a suitable reaction vessel, 25 cc. of concentrated sulfuric acid were added, and the mixture heated to 40° C. A chloroform solution of hydrazoic acid (0.17 mol) was then added dropwise over a period of two hours while stirring vigorously. Agitation was continued at the same temperature for an additional three hours; the mixture was then poured into ice water, the chloroform layer discarded, and the aqueous solution neutralized with barium hydroxide. After removal of the barium sulfate, the hydrogen ion concentration was adjusted to a pH value of 5 with a cation exchanger. The solution was concentrated to 100 cc., and 300 cc. of ethanol were added. A white crystalline precipitate was obtained which, after recrystallization from aqueous methanol, yielded white needle-shaped crystals melting, with decomposition, at 227°–228° C. This product represents one of the new compounds of the present invention, having the above described structure including the sulfur and associated constituents and thus properly classed as methionine sulfoximine, which is a sulfoximine of an S-alkyl thioamino acid. Elementary analysis of this compound gave: Carbon 33.4, hydrogen 6.8, nitrogen 15.6, sulfur 17.9; calculated for $C_5H_{12}N_2O_3S$ (methionine sulfoximine): Carbon 33.3, hydrogen 6.6, nitrogen 15.5, sulfur 17.7.

The suitability of a different acidic catalyst is illustrated by the next example.

Example V

Methionine sulfoxide (0.018 mol) was suspended in 19 cc. of chloroform and mixed with 3 grams of aluminum chloride. Hydrazoic acid (0.033 mol) in 30 cc. of chloroform was added over a period of two hours. The temperature was kept at 50°–53° C. and the mixture was stirred vigorously. Stirring was continued for an additional two hours at the same temperature. After removal of the chloroform the mixture was neutralized with ammonium hydroxide, filtered, and the hydrogen ion concentration of the solution adjusted to a pH value of about 5. The product was isolated from this solution by a further treatment identical with that set forth in Example IV, i. e. as there applied to the aqueous solution after removal of barium sulfate and an adjustment of pH to 5. The product was the same compound as in Example IV, viz. methionine sulfoximine, thus representing an embodiment of the present new compounds.

Instances of other compounds of the invention are as follows, with corresponding additional examples of procedure, including some reactions whereby certain further sulfoximines are produced from those directly obtained by the reaction with hydrazoic acid.

Example VI

Preparation of 4-nitrophenyl methyl sulfoximine: The compound 4-nitrophenyl methyl sulfoxide (0.052 mol) prepared in the usual manner, was mixed with 12 cc. of sulfuric acid and reacted with hydrazoic acid in the manner described in Example II. After neutralization, extraction with chloroform, and concentration of the chloroform layer, the crude product was obtained as pale yellow needles. Upon recrystallization from methanol pure 4-nitrophenyl methyl sulfoximine was obtained, and was found to have a melting point of 139–141° C. Analysis gave: nitrogen found, 13.95; calculated, 13.98.

Example VII

Preparation of 4-aminophenyl methyl sulfoximine: 4-nitrophenyl methyl sulfoximine (2.5 millimols) as prepared in Example VI, was dissolved in 10 cc. of glacial acetic acid and a solution of 3.5 gms. of stannous chloride in 4 cc. of concentrated hydrochloric acid was added. The mixture was heated for a few minutes to the boiling point and then concentrated to dryness in vacuo at low temperature. The resulting product was dissolved in a 10% sodium hydroxide solution and the solution extracted several times with chloroform. A crude product was crystallized from the concentrated chloroform solution and was purified by recrystallization from a mixture of acetone and petroleum ether. The white needles thus obtained melted at 120–122° C., and constituted 4-aminophenyl methyl sulfoximine. Analysis gave: nitrogen found, 16.72; calculated, 16.45.

Example VIII

Preparation of 4-hydroxyphenyl methyl sulfoximine: 4-aminophenyl methyl sulfoximine (0.5 millimol) as prepared in Example VII, was dissolved in dilute sulfuric acid, an equivalent amount of nitrous acid added (forming the diazonium sulfate with respect to the aminophenyl group) and then heated until the diazonium salt had completely decomposed, i. e. to the hydroxyphenyl state. The solution was then carefully neutralized, and extracted with chloroform. The concentrated chloroform solution was then subjected to the same procedure of crystallization and recrystallization as in Example VII, for isolation of the pure product, viz. 4-hydroxyphenyl methyl sulfoximine.

Example IX

Preparation of 4-chlorophenyl methyl sulfoximine: The diazonium chloride was prepared from 4-aminophenyl methyl sulfoximine (1 millimol) of Example VII by reaction of the latter with hydrochloric and nitrous acids, and was converted to the 4-chloro compound by treating it with hot concentrated cuprous chloride in hydrochloric acid. After neutralization the cuprous hydroxide was filtered, and washed with hot water. The filtrate was combined with the washings, and the combined liquid was extracted repeatedly with chloroform. The pure compound, 4-chlorophenyl methyl sulfoximine, was readily isolated from the chloroform solution in a manner similar to that described in Example VI.

Example X

Preparation of 4-(beta-hydroxy-alpha-naphthylazo)-phenyl methyl sulfoximine: The diazonium compound described in Example IX (0.1 millimol) was coupled with an equivalent amount of beta-naphthol in dilute sodium hydroxide, i. e. by adding the solution of the diazonium salt to the latter mixture. An intense coral red-colored precipitate was formed which was filtered, washed, and recrystallized from ethanol, the thus purified product constituting the sulfoximine above named.

In general, the order of mixing the reactants and adding the catalyst may be changed as desired, for example in that the hydrazoic acid can be added to the sulfoxide and then the catalyst, e. g. sulfuric acid added later in small portions, thus to avoid possible decomposition of the sulfoxide by the sulfuric acid where such might otherwise occur.

It is to be understood that the invention is not limited to the specific procedures and products hereinabove described, but may be embodied in other ways and forms without departure from its spirit.

What is claimed is:

1. A process for preparing organic compounds having the sulfoximine structure which has a sulfur atom and four constituents each directly and separately linked to said sulfur atom and in which said four constituents are respectively an oxygen atom, the NH group and two carbon atoms, comprising reacting hydrazoic acid with a sulfoxide of a thioether to yield a product wherein an NH group is coordinated with the sulfur atom.

2. A process for preparing organic compounds having the sulfoximine structure which has a sulfur atom and four constituents each directly and separately linked to said sulfur atom and in which said four constituents are respectively an oxygen atom, the NH group and two carbon atoms, comprising treating a sulfoxide of a thioether with hydrazoic acid in the presence of a catalyst to yield a product wherein an NH group is coordinated with the sulfur atom.

3. A process as described in claim 2, in which the sulfoxide is a dialkyl sulfoxide.

4. A process as described in claim 2, in which the sulfoxide is a diaryl sulfoxide.

5. A process as described in claim 2, in which the sulfoxide is an alkyl aryl sulfoxide.

6. A process as described in claim 2, in which the sulfoxide is the sulfoxide of an S-alkyl thio amino acid.

7. A process for preparing organic sulphoximines of the formula $RR'S(NH)O$, wherein $R$ and $R'$ are members of the group consisting of hydrocarbon and carboxyalkyl, which comprises reacting the corresponding sulfoxide of the formula $RR'SO$, wherein $R$ and $R'$ are as defined above, with hydrazoic acid in the presence of an acidic catalyst and an inert organic solvent.

LASZLO REINER.
FERNANDA FIORDALISI, née
FERNANDA MISANI.

References Cited in the file of this patent

Bentley et al., Nature, vol. 163, pages 675–676 (1949).

Bentley et al., Nature, vol. 164, pages 438–439 (1949).

Bentley et al., Nature, vol. 165, page 1501 (1950).